(No Model.)
T. J. MOORE.
EGG PRESERVING APPARATUS.
No. 347,498. Patented Aug. 17, 1886.
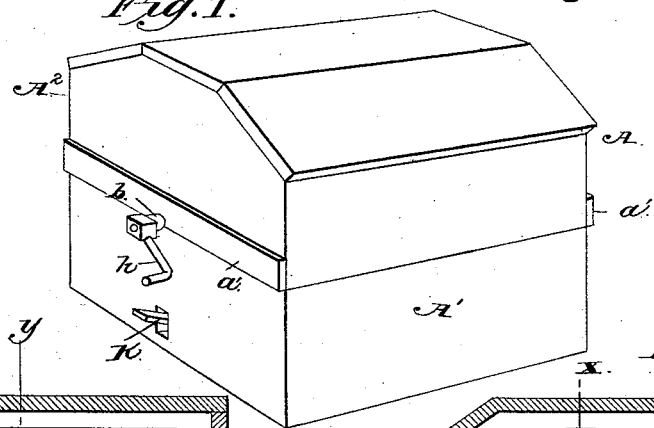
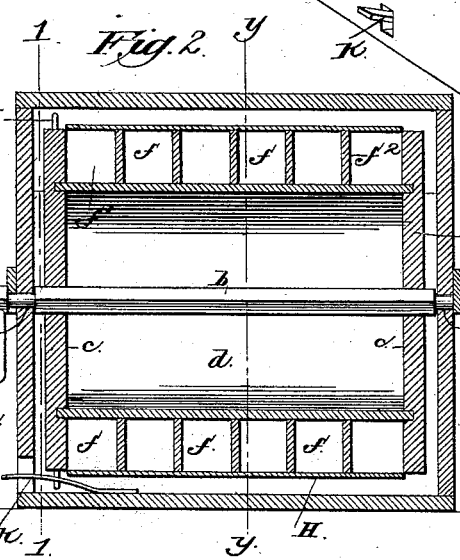
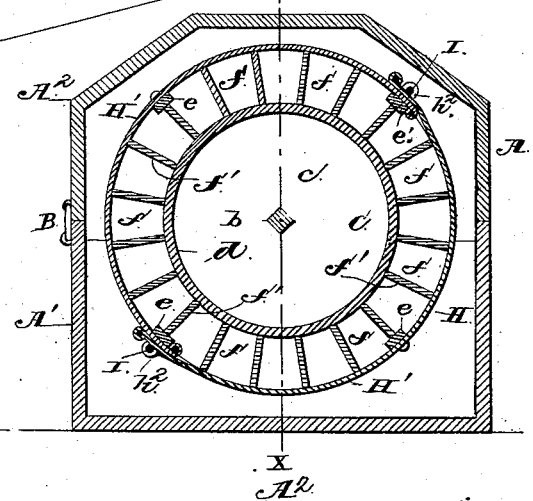
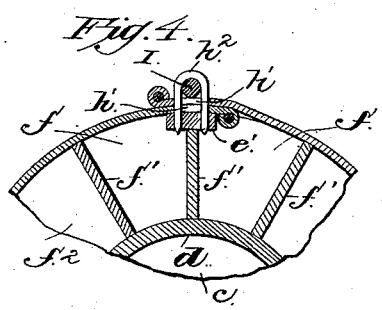
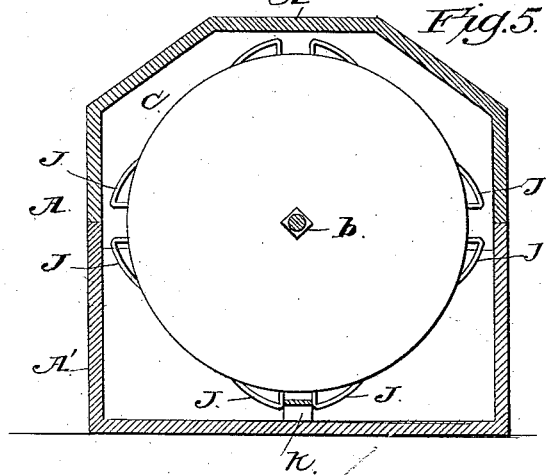
Witnesses
M. Fowler
Inventor
T. J. Moore
By his Attorneys

UNITED STATES PATENT OFFICE.

THOMAS JEFFERSON MOORE, OF WACISSA, FLORIDA.

EGG-PRESERVING APPARATUS.

SPECIFICATION forming part of Letters Patent No. 347,498, dated August 17, 1886.

Application filed November 19, 1885. Serial No. 183,329. (No model.)

*To all whom it may concern:*

Be it known that I, THOMAS JEFFERSON MOORE, a citizen of the United States, residing at Wacissa, in the county of Jefferson and State of Florida, have invented a new and useful Improvement in Egg-Preserving Apparatus, of which the following is a specification, reference being had to the accompanying drawings.

My invention is an improvement upon egg-preserving apparatus; and it consists in the construction, combination, and arrangement of the various parts for service, substantially as hereinafter fully set forth, and specifically pointed out in the claim.

The principle of my invention is based upon the well-known fact that if the yelks are prevented from coming in contact with the shell and held in suspension in the albumen thereof they will be preserved for a much longer period of time than otherwise; and it has for its object, among other things, to provide a rotating cylinder, whereby the eggs are brought to lie in different positions, so that the yelks thereof are suspended in the albumen and prevented from coming in contact with the shell; to provide means for holding the eggs in position in said cylinder while the same is in motion; to provide for the ready removal thereof without danger of breakage; to provide for limiting the cylinder to a half or quarter revolution, and to provide means which shall be simple, strong, and durable in construction, and thoroughly effective and easy of operation.

I have illustrated in the accompanying drawings the best means for carrying my invention into effect, in which Figure 1 is a perspective view of my improved egg-preserving apparatus. Fig. 2 is a longitudinal vertical sectional view on the line $x\ x$ of Fig. 3. Fig. 3 is a transverse sectional view taken at right angles to the sectional view Fig. 2, and on the line $y\ y$ of said figure. Fig. 4 is a detail view of one form of fastening device for holding the eggs within the cells of the cylinder, and Fig. 5 is a view showing the cylinder in end elevation and the inclosing-case thereof in section, the said sectional view being taken on the line 1 1 of Fig. 2.

Referring to the drawings, in which like letters of reference indicate corresponding parts in the several figures thereof, A designates the inclosing-casing, and C the revolving drum rotatively mounted therein and detachable therefrom. The inclosing-casing A is made in two sections, A' A$^2$, the section A' resting on the floor or other surface, and having bearings $a$ therein for the shaft $b$ of the drum C, and section A$^2$ having depending flanges $a'$, which fit over the edges of the lower case-section and are detachably connected thereto.

B designates a clasp or catch comprising a staple and hook to secure the top and base-sections of the inclosing-case together; but I would have it understood that I do not desire to limit myself to any construction of inclosing-case of the boxes or bearings $a$ for the supporting-shaft of the rotating drum, or of the means for securing the sections of my preferred form of inclosing-casing together, as I am aware that many changes therein may be made without departing from the principle of my invention.

The drum C comprises two heads, $c\ c$, an inner shell or cylinder, $d$, rigidly secured to and connecting the heads $c$ at a distance from the peripheries thereof, a number of cross-bars, $e\ e'$, secured in recesses in the peripheries of the drum-heads and lying flush therewith, and a series of cells, $f$, formed by interlocking strips $f'\ f^2$, arranged at right angles to each other, with their upper edges on the plane of the peripheries of the drum-heads $c$, and secured to the shell $d$, and in grooves in the inner faces of the heads $c$. Any preferred means may be employed to hold the strips of the cells within the drum. The shaft $b$ of the drum is squared at the point where it is secured to the drum-heads, and made cylindrical where it rests in the bearings or boxes $a$, and at its extreme outer ends the shaft has handles or cranks $h$ for conveniently rotating the drum or cylinder.

H designates an inclosing-cover for the cylinder or drum, to prevent the eggs from falling therefrom, said cover being made in two or more sections, H'. Each section of the inclosing-cover is secured at or near its middle to one of the cross-bars $e$ of the cylinder or drum by tacks, staples, or in any suitable manner, and at its ends the sheath-section is provided with openings $h'$, which fit over eyes or staples $h^2$, secured to the cross-bar $e'$. The ends of the sheath-sections overlap one another on the cross-bars $e'$, and the apertures $h'$ thereof are fitted over the eyes $h^2$, and when the sheath-sections are in this position they are secured by means of pins or rods I, which are passed through the eyes of each cross bar $e'$, and thus prevent the ends of the sheath-sections from becoming disengaged. The rods are easily and readily removed to permit the eggs to be introduced or withdrawn from the cells $f$, and the inclosing-sheath is made of any suitable flexible material, preferably textile fabric. The ends of each sheath-section are lapped over upon itself and provided with a strengthening-strip.

To introduce eggs into the cells it is only necessary to rotate the drum so that one of the pins I is brought uppermost, when said pin is withdrawn and the meeting overlapping ends of two of the sheath-sections are thrown back to expose the cells. The eggs are now put into the cells in the ordinary well-known manner, and the ends of the flexible sheath-sections are again secured to the cross-bar $e'$ in the manner before described.

The number of sheath-sections employed to inclose the drum depends upon the size thereof; but for ordinary storage purposes but two sections are employed, so that when they are open, or thrown back to expose the cells, one-half or a quarter of the area of the drum or cylinder can be filled with the eggs.

I have found by experiment that good results are produced if the drum or cylinder is given a semi-revolution once in every twenty-four (24) hours, but it can be turned more or less frequently, as desired.

To determine the distance rotated or traveled by the drum during its rotation, and to provide for the regulation of such rotation of the drum, I have provided a series of stops, J, which engage with a spring-catch, K, during the rotatory movement of the drum. The stops and spring-catch may be arranged in any preferred manner, and be of any preferred construction.

I have shown a series of four stops secured to the periphery of one of the heads of the drum, and spaced apart thereon at equal or regular distances, and adapted to engage the spring-catch, secured at one end to the bottom of the base-section of the inclosing-case. The stops J of each pair are made preferably tapering in opposite directions, with their longest vertical ends arranged a short distance apart, to provide an intermediate space or notch into which the end of the spring-catch fits. By means of the tapering stops, arranged as described, the spring-catch engages the same when the drum is rotated in either direction, and when the lower end thereof strikes the catch it is gradually depressed by the beveled stop riding upon the same during the rotation of the drum until the space between the stops comes opposite the catch, which will then be forced therein by the recoil action of the spring and stop, and prevent the drum from further rotation.

In lieu of making each pair of stops in separate independent pieces, they may constitute a single casting and be bolted or screwed to the head $c$, and the free outer end of the spring-catch K projects through an aperture in the casing, so as to permit the catch to be depressed by hand to disengage the same from the stops to allow the cylinder to be rotated.

The operation of my invention will be readily understood from the foregoing description, taken in connection with the drawings.

My improved egg-preserving apparatus may be employed for the purpose of storing the eggs, or for transporting the same for long distances; and it can be made of any size or dimensions to suit the circumstances.

I do not desire to limit myself to the details of construction herein shown and described, as I am aware that many changes therein may be made without departing from the principle of my invention.

To empty the drum of the eggs, it is removed from the bearings or boxes $a$ of the case and rested on the floor or other place. The drum is now turned so as to bring one of the rods I near the surface of the floor, when one end of one of the cover-sections is disengaged therefrom and the drum rolled away from the said released end of the sheath-section, thus permitting the eggs to fall out upon the section without danger of breaking or injuring them.

My improved apparatus is thoroughly effective and easy of operation, provides for regulating the distance rotated or turned, prevents the yelks of the eggs from coming in contact with the shells, and thus obviates the danger of permitting them to become spoiled, is simple, strong, and durable in construction, and provides convenient means for storing and shipping the eggs.

Having thus fully described my invention, what I claim as new, and desire to secure by Letters Patent, is—

In an egg-preserving apparatus, the combination of an inclosing-case, a rotating drum journaled therein, and having a series of cells and a series of spaced stops at its periphery, each of the stops having oppositely-inclined faces and an intermediate notch, and a spring-catch secured at one end to the case, and having one end projected through a slot in the case, to adapt the catch to be released by hand, the said spring-catch riding on the inclined faces of the stops when the drum is rotated and entering the notch therein, as set forth.

In testimony that I claim the foregoing as my own I have hereto affixed my signature in presence of two witnesses.

THOMAS JEFFERSON MOORE.

Witnesses:
E. B. BAILEY,
S. C. BOTT.